United States Patent [19]

Gude et al.

[11] 4,372,926

[45] Feb. 8, 1983

[54] PROCESS FOR DESULFURIZATION, DEDUSTING AND DISCHARGE OF HOT FLY ASH-CONTAINING FLUE GAS

[75] Inventors: Klaus E. Gude, Vedbæk; Karsten S. Felsvang, Allerod, both of Denmark; Everett L. Coe, Downey, Calif.

[73] Assignees: A/S Niro Atomizer, Søborg, Denmark; Joy Manufacturing Company, Pittsburgh, Pa.

[21] Appl. No.: 256,533

[22] Filed: Apr. 22, 1981

[30] Foreign Application Priority Data

Jun. 30, 1980 [DK] Denmark ............................. 2820/80

[51] Int. Cl.$^3$ .......................... B01J 8/00; C01B 17/00
[52] U.S. Cl. .................................................... 423/244
[58] Field of Search .......... 423/242 A, 244 A, 242 R, 423/244 R

[56] References Cited

U.S. PATENT DOCUMENTS

| | | | |
|---|---|---|---|
| 1,912,381 | 6/1933 | Meston | 55/80 |
| 2,862,789 | 12/1958 | Burgess | 433/242 |
| 3,733,777 | 5/1973 | Huntington | 423/242 |
| 3,733,781 | 5/1973 | Billisio et al. | 423/242 |
| 3,785,119 | 1/1974 | McIlvaine | 423/242 |
| 4,197,278 | 4/1980 | Gehri et al. | 423/242 |

FOREIGN PATENT DOCUMENTS

138207 7/1978 Denmark .
195708 8/1964 Sweden .
2021086 11/1979 United Kingdom .

*Primary Examiner*—Earl C. Thomas
*Assistant Examiner*—Gregory A. Heller
*Attorney, Agent, or Firm*—Schuyler, Banner, Birch, McKie & Beckett

[57] ABSTRACT

In connection with the desulfurization and dedusting of flue gas where use is made of a combined spray drying and absorption and the material produced by this process is filtered off from the gas stream together with fly ash, a heating of the flue gas is performed prior to its discharge into the atmosphere by admixture of hot, non-purified flue gas. This admixture takes place so that the flue gas serving for the reheating passes through only a part of the available filter area, which allows the remaining part of the filter area to be kept at a relatively low temperature. This results in a particularly high sulfur dioxide absorption being achieved during the passage of the flue gas through the filter.

A baghouse unit divided up in a special manner can be used in the process.

8 Claims, 8 Drawing Figures

PROCESS FOR DESULFURIZATION, DEDUSTING AND DISCHARGE OF HOT FLY ASH-CONTAINING FLUE GAS

BACKGROUND OF THE INVENTION

1. Field of the Invention

The present invention relates to a process for removing sulfur dioxide and fly ash from flue gas originating from large boiler units such as those used in power plants and to a baghouse unit for use in said process.

2. Prior Art

Various processes for reducing the content of sulfur oxides in flue gas are known. A review of such processes appears in the published British patent application No. 2021086A and in U.S. Pat. No. 4,197,278.

The present process is of same type as the one dealt with in said U.S. Pat. No. 4,197,278. In this process sulfur oxides are removed from flue gas in two steps, viz. both a combined spray drying and absorption process, and a subsequent filtering process.

In the former step, an aqueous medium containing a basic absorbent is sprayed into the hot flue gas, whereby the sprayed aqueous medium is dried into a powder while at the same time a chemical reaction takes place between the basic absorbent and the sulfur oxides present in the flue gas, which results in these oxides being bound in the powder, mainly as sulfite.

In the second step of said prior art process, the flue gas is, together with the powder produced during the first step and in suspension in the flue gas, led to a filter, such as a baghouse, where said powder is filtered off together with fly ash, if any. Said powder contains unreacted basic material which, while the powder is in the filter, comes into further contact with the flue gas, which results in some absorption of sulfur oxides taking place also during this second step.

According to said U.S. patent specification, an advantage of the process is that the flue gas is not cooled so much that it needs reheating prior to its discharge into the atmosphere.

In order to achieve optimum conditions for reaction between sulfur oxides and basic absorbent in the spray drying-absorption process and thereby a maximum utilization of the absorbent, it is however suitable to reduce the temperature of the flue gas in this spray drying-absorption process to a value which is lower than the required value, if the flue gas were to be discharged into the atmosphere without reheating. In such case it is necessary to reheat the flue gas in order to ensure that it is sufficiently dispersed into the atmosphere.

This reheating can often be performed most economically and conveniently by admixture of a minor amount of hot, not purified flue gas from the same or similar source as the flue gas which is being purified.

As this non-purified flue gas of course contains sulfur oxides, it is of importance that it should be used in a comparatively small amount, for which reason it should be as hot as possible in order to produce the desired temperature increase. Consequently, in plants where the main portion of flue gas after its discharge from the boiler passes through heat exhanging members, the flue gas to be used for reheating will preferably be removed direct from the boiler plant and by-pass said heat exchange members.

In addition to sulfur oxides, the flue gas used for the reheating contains fly ash which has to be removed before allowing the gas to be discharged into the atmosphere.

It has therefore been obvious to add this hot flue gas serving for reheating to the flue gas coming from the spray drying-absorption process prior to the introduction of the latter into the baghouse, in such an amount that the flue gas after passing through the filter will be sufficiently hot to permit its discharge into the atmosphere. This solution results in an overall temperature increase in the baghouse plant.

The minimum temperature permissible for the purified gas to be released into the atmosphere lies typically between 75° and 95° C. When using the above-mentioned reheating process, a temperature of this order will therefore prevail over the whole filter area.

SUMMARY OF THE INVENTION

It has now been found, however, that the absorption of sulfur dioxide which takes place in the baghouse unit is to a great extent dependent on the temperature and that it is substantially higher at the temperature of the flue gas as leaving the spray drying-absorption prior to the addition of hot flue gas intended for reheating than at the temperature reached after this addition.

This temperature dependency of the absorption is such that said absorption is very low in the baghouse, when the total amount of flue gas leaving the spray drying-absorption step, prior to its introduction into the baghouse, is reheated to the minimum temperature required in view of the discharge into the atmosphere. On the contrary, a considerable sulfur dioxide absorption will take place in the baghouse at the temperature of the said gas prior to the addition of the flue gas serving for reheating.

Consequently, a better absorption and thereby a reduced absorbent consumption can be achieved without expensive additional installations by carrying the reheating process in such a manner that the hot flue gas serving for reheating is, possibly after addition of an amount of flue gas leaving the spray drying-absorption step sufficient to reduce the temperature to a level tolerable in the baghouse, passed only through a portion of the baghouse, while the remaining part of the comparatively cold flue gas from the spray drying-absorption step is passed through the rest of the baghouse and is only afterward reunited with the hotter stream which has passed through the first-mentioned portion of the baghouse.

Accordingly, the present invention relates to a method for desulfurization, dedusting and discharge of hot, fly ash containing flue gas produced in a boiler plant, by means of a combined spray drying-absorption step and removal of the material produced by the spray drying-absorption and the fly ash in a filter plant, in which process a reheating of the gas takes place by mixing with a stream of hot flue gas by-passed the spray drying-absorption step, comprising conducting said by-passed gas through only a part of the filter area of the filter plant, reserving the remainder of the filter area for filtering only gas having been treated in the spray drying-absorption step.

The stream of flue gas which is by-passed the spray drying-absorption step and used for reheating may be a very hot stream (e.g. 300°–600° C.) obtained directly from the exhaust of the boiler furnace or it may be a somewhat less hot stream having previously been used for preheating combustion air or water for the boiler plant in which case the temperature of the stream will be substantially less, e.g. 100°–300° C.

Since the fabric filter in the filter plant will usually not be able to resist for long periods the temperature of first mentioned very hot gas, a special embodiment of the process is used when the reheating is performed by means of this very hot gas. Said embodiment comprises the following steps:

(a) the flue gas produced in a boiler plant is removed in two streams or divided into two streams, (b) the first of these streams is passed through a unit intended for preheating the combustion air and/or feed water of the boiler plant, whereby the first stream is cooled, (c) an aqueous suspension of basic material is sprayed into the first stream, whereby the water of the suspension evaporates resulting in a further cooling of the first stream to a temperature lower than the temperature permissible if the stream should without admixture or reheating be discharged into the atmosphere after the subsequent purification, and a substantial portion of the sulfur dioxide of the first stream is absorbed forming a powder containing reaction products of the absorption and unreacted basic material, (d) the first stream containing in suspension a substantial portion of the powder produced and of the initial fly ash is led to a baghouse plant, the second stream originating from step (a) being used for reheating the first stream by admixture therewith, and (e) a stream leaving the baghouse unit and comprising the total amount of flue gas is discharged into a atmosphere, and is characterized in that step (d) is carried out so that the second stream mixed with a partial stream derived from the cooled off first stream passes only through part of the baghouse filter area, while only the remaining portion of the first stream passes through the rest of the baghouse filter area.

The advantage offered thereby is that the temperature prevailing in the filter area passed exclusively by the said remaining portion of the first stream is so low that a substantial sulfur dioxide absorption takes place. The part of the filter area passed by the second stream mixed with a minor portion of the first stream has so high a temperature that practically no absorption takes place but this part represents a so small portion of the total filter area that a substantially greater absorption takes place in the baghouse plant as a whole by the process according to the invention than if the second stream had been mixed up with the total amount of the first stream prior to its introduction into the baghouse plant.

A preferred embodiment of the process is, according to the invention, characterized in that in step (c) water is added in such an amount that the temperature of the first gas stream falls to 60°–75° C., and in that in step (d) the two streams are divided so that the second stream together with a portion of the first stream is only passed through 10–40% of the baghouse filter area, while only the first stream passes through the remaining 90–60% of the filter area, and in that the quantitative ratio of the first to the second stream is adjusted so as to obtain a temperature of 70°–95° C. for the total amount of flue gas released to the atmosphere. By this embodiment an adequate absorbent utilization is combined with a good thermal economy.

For carrying out the process, it is preferred to use a baghouse plant having a filter consisting of glass fibers coated with polytetrafluoroethylene, and this preferred embodiment is characterized in that prior to, or in connection with the introduction into the baghouse, the cooled off first stream is added to the second stream in such an amount as to obtain a temperature between 120° and 250° C. before contacting the baghouse fabric. These limits are fixed in view of the fact that a good durability of the baghouse fabric can be expected when operating at a temperature below 250° C. and in view of the fact that the temperature of the mixture should not be chosen so low as to require, for reaching it, the addition of a large quantity of cooled gas from the first stream: the mixed stream would then be so large that it would require too great a portion of the total filter area of the baghouse plant. It goes without saying that it is desirable to keep this part of the filter area where no substantial absorption takes place so small as possible, while at the same time keeping the temperature in this portion so low that the filter will not be damaged.

In case the reheating is performed by means of a stream of flue gas which has already been cooled to some extent in a preheater as mentioned above, it is not necessary to mix said reheating stream with gas from the spray drying-absorption step before filtering, and consequently the invention also comprises an embodiment for desulfurisation, dedusting and discharge of a stream of hot, fly ash containing flue gas produced in a boiler plant and having served for preheating a flow selected from combustion air and feed water for the boiler plant, having thereby being cooled, comprising the steps of (1) deviding the gas stream in a first stream and a second stream, (2) spraying an aqueous suspension of basic material into said first stream, whereby the water of the suspension evaporates resulting in a further cooling of the first stream to a temperature lower than the temperature permissible, if the stream should without admixture or reheating be discharged into the atmosphere after subsequent purification, and a substantial portion of sulfur dioxide of the first stream is absorbed forming a powder which contacts reaction products of the absorption and unreacted basic material, (3) passing the second stream through a part of a fabric filter of a baghouse plant, (4) passing the first stream through the remainder of the baghouse plant, and (5) downstream of the fabric filter mixing said first and said second stream and discharging the mixture thereof into the atmosphere.

When using this last mentioned embodiment the second stream used for reheating will usually amount to 10–20% by weight of the total stream of flue gas treated, whereas the second stream only amounts to 2–6% by weight of the total amount of gas, in case said second stream is withdrawn upstream of the preheater and consequently is not cooled therein.

If use is made of a baghouse plant consisting of a plurality of separate units, one can choose, e.g. to lead the second flue gas stream, in case together with part of the first stream, through one of the baghouse units, and to lead the remaining portion of the first stream through the other baghouse units. It is, however, a special feature of the invention that also in cases where only a single unit or a few baghouse units are available, it is possible to achieve that the comparatively hot gases only pass through the desired part of the filter area. This may be achieved in a preferred embodiment of the invention, by placing in a simple manner partition walls in known baghouse units consisting of a plurality of sections, to lead the second stream, in case with part of the first stream, through one or more sections of a baghouse unit separated by partition walls from the remaining baghouse sections through which only flue gas from the first stream is passed.

Accordingly, the invention further relates to a baghouse unit for use in carrying out the process, which unit is divided into sections and is provided with an outlet duct in connection with all the sections, this unit being characterized in that it is provided with two inlet ducts for the gas, passageways from one of the inlet ducts to at least one but not all the sections of the unit, and passageways from the second inlet duct to the other sections.

BRIEF DESCRIPTION OF THE DRAWING

The invention will in the following be further illustrated with reference to the drawing in which.

DESCRIPTION OF THE MOST OBVIOUS SYSTEM

Figure 1:
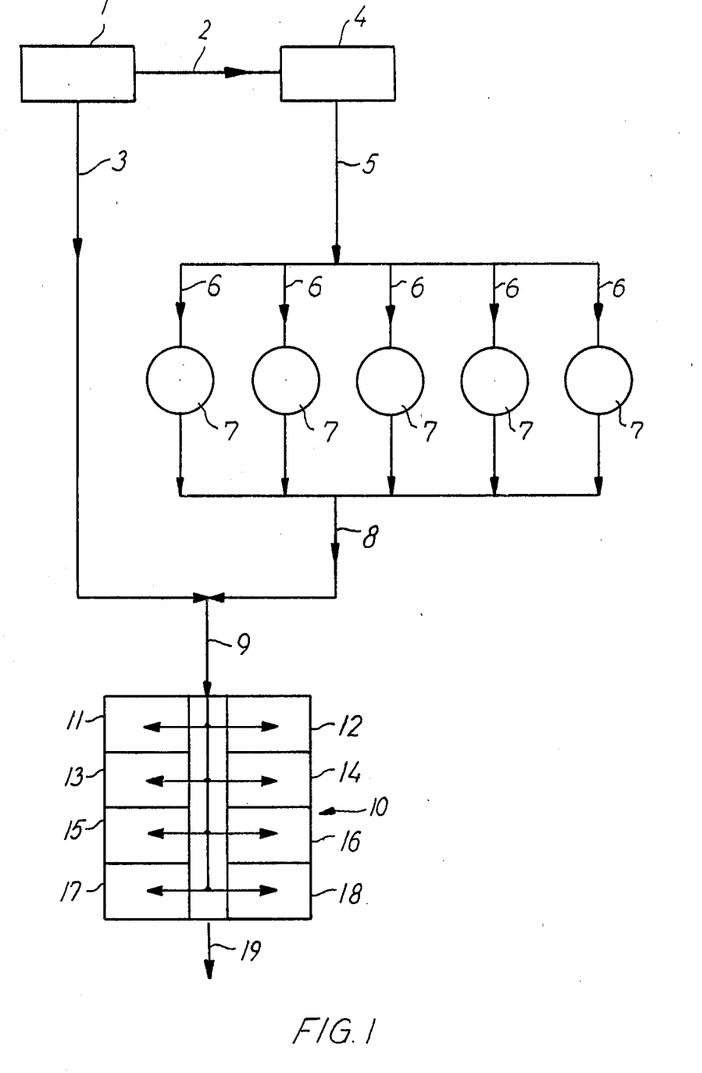
FIG. 1 illustrates the most obvious principle for reheating gas coming from the spray drying-absorption plant.

In FIG. 1, 1 is a boiler plant which may be composed of one or of a plurality of boilers.

Two hot flue gas streams are leaving the boiler plant 1, viz. a first stream which is led through a duct 2 and a second stream which is led through a duct 3. As an alternative, a single stream may be removed from the boiler plant 1, said stream being afterwards divided into a first stream and a second stream led through the ducts 2 and 3, respectively.

In typical cases, the temperature of said first and second stream will be between 300° and 550° C.

Via duct 2 the first stream is led to a heat exchange unit 4 serving to preheat the combustion air and/or feed water of the boiler plant. In unit 4 the first stream of flue gas is cooled down to a temperature which in typical cases will be between 120° and 170° C. and via ducts 5 and 6 it is led to spray drying-absorption units 7, use being made of five of these units in the embodiment shown. In each of the units 7 is sprayed an aqueous suspension of basic material, preferably slaked lime and recycled material comprising fly ash, calcium sulfite, calcium sulfate, calcium carbonate and unreacted calcium hydroxide.

From the spray drying-absorption units 7 is recovered (not shown in the drawing) a powder suitable for recycling to the suspension of basic material and having the said composition (calcium sulfite, calcium sulfate, calcium carbonate, calcium hydroxide and fly ash). A substantial portion of the powder produced by the spray drying-absorption process in the units 7 is, however, removed from said units, entrained by the gas stream which is led to a duct 8. At this stage the temperature of the first stream has been reduced to a value lying typically between 60° and 75° C. as a result of the water evaporation taking place in the spray drying-absorption units 7.

The first stream in duct 8 is then combined with the second in duct 3 and the amount of the two streams is adjusted so that the temperature of the united gas stream which is led through a duct 9 to a baghouse plant 10 is so high to allow the gas stream to be discharged into the atmosphere after filtering, regard being had to the fact that a certain temperature fall, e.g. of about 5° C., may take place in the baghouse unit 10.

In the outlined embodiment, the baghouse 10 consists of a total of eight section 11–18 and the mixed gas stream coming from duct 9 is equally distributed between all the sections, which results in the temperature being uniform in these sections and being approximately the same as the one at which the purified gas is discharged into the atmosphere, i.e. in typical cases between 77° and 95° C., preferably about 85° C. After passing the filter fabric of the individual sections, the gas coming from these is united and led to an outlet duct 19 wherefrom it is discharged into the atmosphere.

As a result of the fact that a relatively high temperature is prevailing in all the sections 11–18 of the baghouse unit 10, only a comparatively low sulfur dioxide absorption takes place during the passage of the flue gas through the layer formed on the filter fabric and consisting of powder produced in the spray drying-absorption units 7 and of fly ash originally present in the gas.

DESCRIPTION OF PREFERRED EMBODIMENTS

Figures 2, 8:
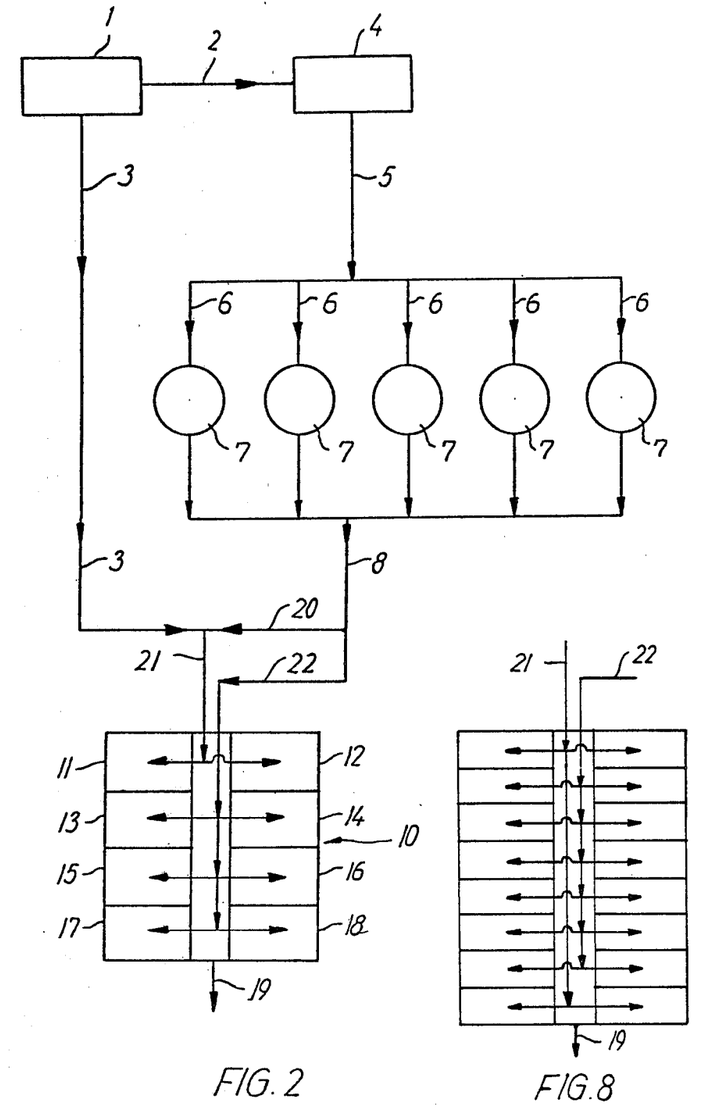
FIG. 2 illustrates an embodiment of the process according to the invention using very hot reheating gas coming directly from the boiler.
FIG. 8 illustrates a further embodiment of the baghouse unit of the invention.

In the process according to the invention the flow pattern is changed, for instance, as it appears from FIG. 2 where the elements bearing the same number as in FIG. 1 have the same meaning as in the above description referring to FIG. 1.

In the process according to the invention the first part of the process, i.e. including the stage when the first stream reaches duct 8 and the second stream duct 3, is carried out exactly as described in connection with FIG. 1.

As shown in FIG. 2, a partial stream 20 is, however, in the process according to the invention, removed from the first stream in duct 8 and this partial stream is united with the second stream from duct 3 to form a stream 21 having a temperature which the baghouse can stand, e.g. between 120° and 250° C. This united stream 21 is in the embodiment shown introduced into two of the sections (11, 12) of the baghouse unit 10.

The remaining portion of the first stream from duct 8 is led through a duct 22 to the other sections (13–18) of the baghouse unit. After having passed the filter fabric, the stream led to the sections 11 and 12 and the stream led to the sections 13–18 are united and leave the baghouse having a temperature suitable for the discharge of the gases into the atmosphere.

As a relatively low temperature, e.g. 60°–75° C. is prevailing in the sections 13–18, i.e. in ¾ of the baghouse plant, a substantial sulfur dioxide absorption takes place in these sections and although the absorption in ¼ of the whole baghouse plant, viz. in sections 11 and 12, is negligible, the absorption achieved in the whole baghouse will be substantially greater than the one achieved when use is made of the principle illustrated in FIG. 1.

Figure 3:
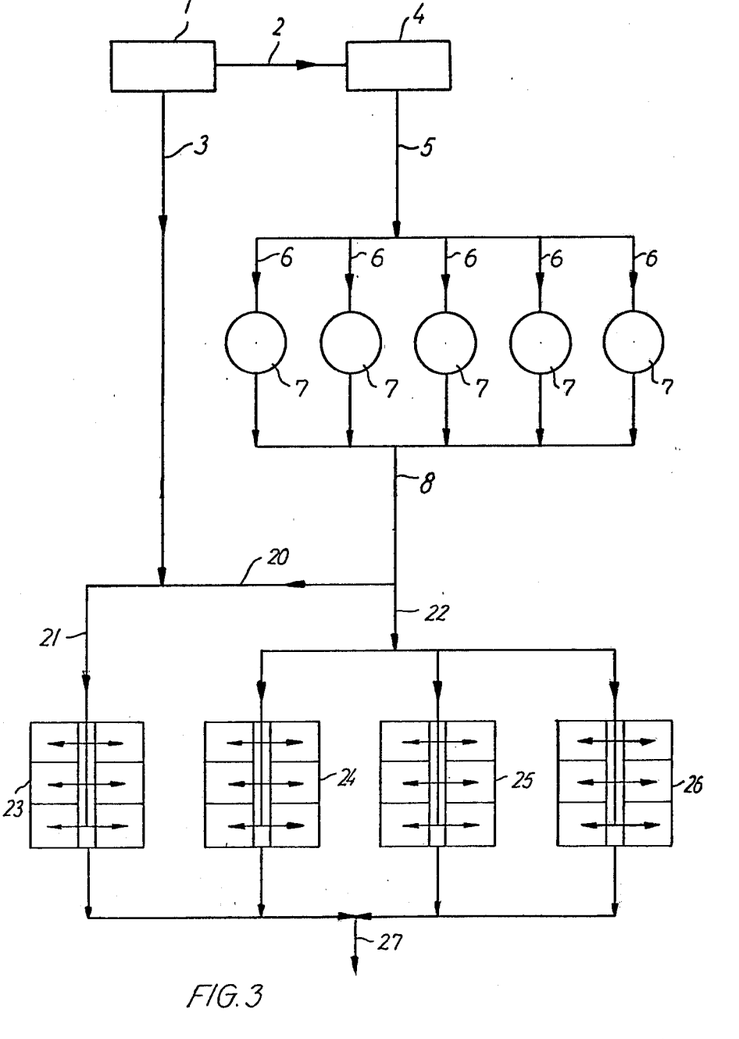
FIG. 3 illustrates another embodiment of this type of the process according to the invention.

An alternative embodiment of the process of the invention is outlined in FIG. 3, in which the rule also applies that the elements having the same number as in FIG. 1 have the same meaning as stated in the description referring to FIG. 1.

In this embodiment also, the first part of the process, i.e. including the stage where the first stream reaches duct 8 and the second stream duct 3, is carried out as described in connection with FIG. 1.

In this embodiment the stream 21 composed of the partial stream 20 and of the second stream from duct 3 is led to a baghouse unit 23 receiving exclusively this gas stream which is distributed in all the sections of the baghouse unit 23. The remaining part of the first stream 20 from the duct 22 is equally distributed between the baghouse units 24, 25 and 26. In this embodiment the temperature prevailing in the baghouse unit 23 will be, e.g., between 120° and 250° C. while the temperature in the baghouse units 24, 25 and 26 will only be, e.g., 60°–75° C., and therefore a substantial $SO_2$ absorption is achieved in these three last-mentioned baghouse units. The absorption is very low in the hot filter unit 23 but as a result of the greater absorption in the three filter units, one obtains a total absorption substantially greater than would have been been obtained by the process according to FIG. 1.

The relatively hot gas stream leaving the baghouse 23 is united with the three gas streams from the baghouses 24, 25 and 26, which results in the total united gas stream 27 reaching a temperature which is sufficiently high, e.g., 70°–95° C., to allow its discharge into the atmosphere.

Figure 4:
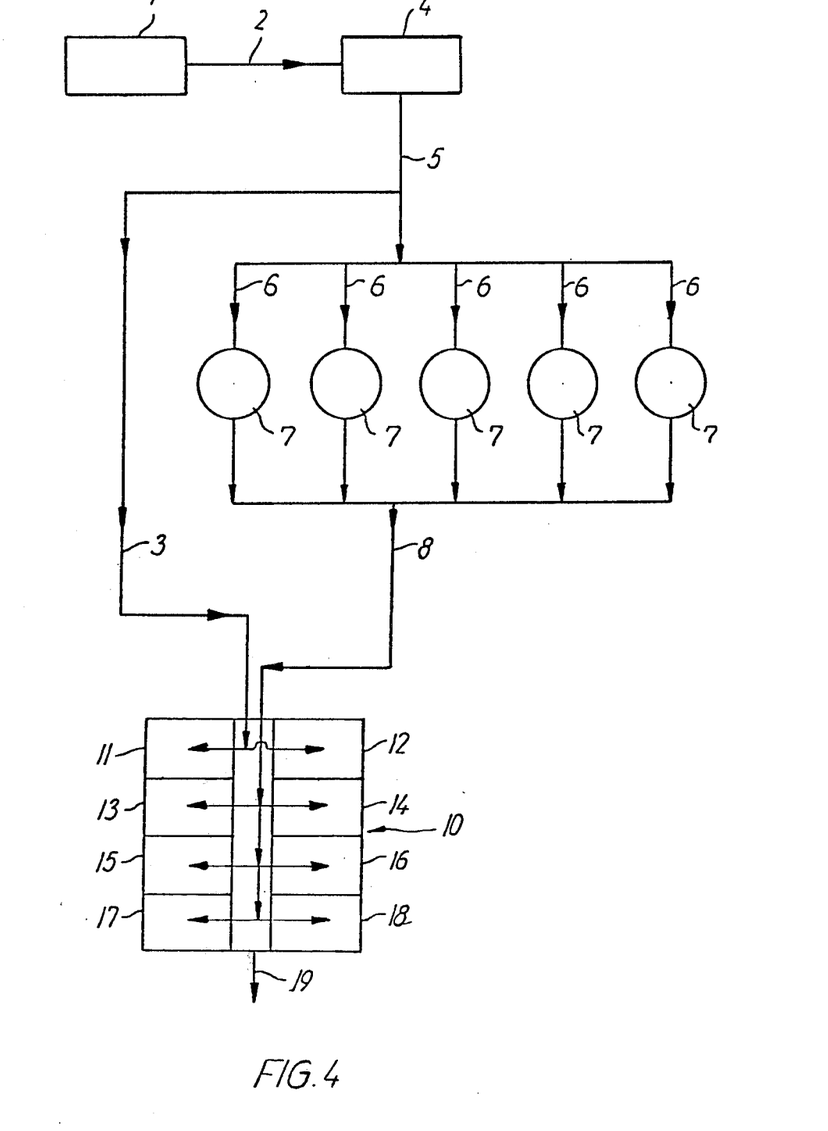
FIG. 4 illustrates an embodiment according to the invention using reheating gas withdrawn downstream of the preheater.

Another embodiment of the process of the invention is depicted in FIG. 4. In this embodiment the second stream to be used for reheating is withdrawn downstream of the heat exchanger unit 4. This second stream need not be mixed with relatively cool gas before being introduced into the baghouse, for which reason it is led direct to the compartments 11 and 12 of the baghouse, which compartments receive no other gas than said second stream.

The embodiment depicted in FIG. 3 may of course be modified correspondingly in case also in this embodiment the second stream is withdrawn downstream of the heat exchanger unit 4 instead of direct from the boiler 1. In this case the partial stream 20 will be omitted.

Figure 5:
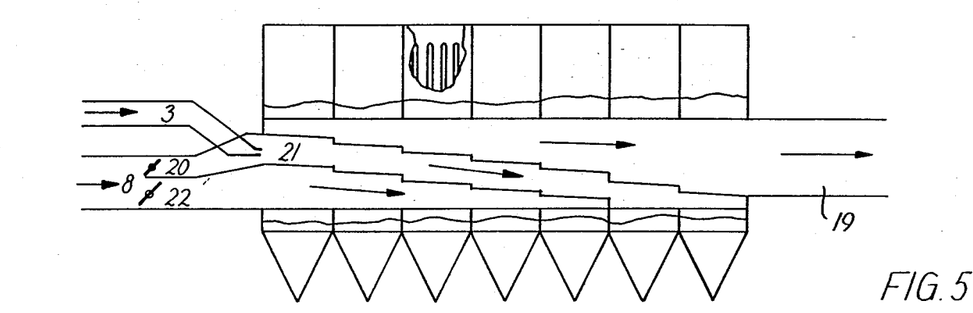
FIG. 5 is a schematic lateral view of a baghouse unit according to the invention for use as an alternative to the baghouse shown in FIG. 2.
Figure 6:
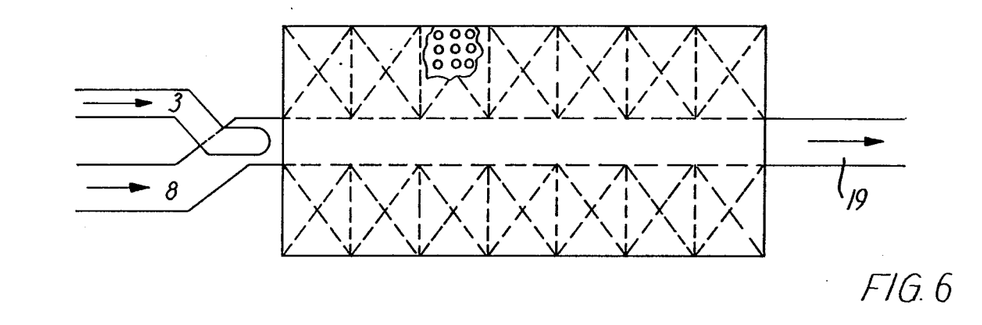
FIG. 6 is a schematic view of the baghouse unit of FIG. 5 seen from above.

The baghouse unit 10 outlined in FIG. 2 can suitably be replaced by a baghouse unit as shown in FIGS. 5 and 6. The elements which are provided with reference numerals in these figures correspond to the similarly numbered elements of FIG. 2.

As it will appear, this baghouse unit is divided into a total of 14 sections having each a tapered bottom for collecting and removing the powder falling therein when the filter bags are cleaned in a known manner by reverse flow or pulsating flow or the like.

The central part of the filter unit is divided so as to provide two inlet ducts, viz. duct 22 and the duct 65 wherein the stream 21 is led, and an outlet duct 19. Duct 22 is provided with dampers (not shown) allowing passage from duct 22 to each of the first 10 sections of the baghouse unit. The stream 21 has, on the contrary, only access to the last two sections (also through—not shown—dampers). All the sections have, through (not shown) dampers, an access to the outlet duct 19.

It will be noted that the said division of the central part of the unit is effected so that the cross section of the passageways is adjusted to the quantity of gas which is to flow through the passageways in the different zones of said passageways, which results in a uniform distribution of the gas to be filtered to the different sections.

As it will appear, the relatively cold gas coming from duct 8 will exclusively pass through ten of the sections, while the stream 21 which has a higher temperature, as it received hot gas from duct 3 in addition to the relatively cold partial stream 20 from duct 8, will flow through the remaining four sections which are shown farthest to the right.

The duct 3 has a rather narrow debouchment to provide a jet of the second stream into the partial stream 20 to obtain an efficient intermixing of said two streams.

In case this baghouse is used in connection with a process as depicted in FIG. 4 no mixing of gases has to take place before the gas is filtered since the partial stream 20 does not exist.

Figure 7:
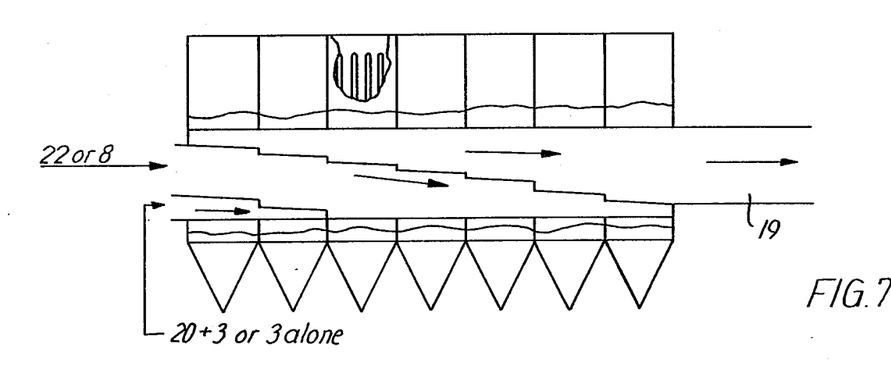
FIG. 7 is a schematic lateral view of another baghouse according to the invention.

In the baghouse schematically illustrated in FIG. 7 the sections to receive the hot gas are located at the end receiving the gas streams as also shown in FIGS. 2 and 4. This embodiment will usually be preferred since the construction thereof is quite simple involving a minimum of partition walls to be used. The upper duct 22 receives the first stream (or the rest thereof) and the lower duct receives either the second stream (through 3) plus the partial stream 20 or it receives just the second stream in case the second stream has only been taken from the main stream after the latter has passed the heat exchanger unit 4.

Instead of placing the four sections receiving the relatively hot gas at one end of the baghouse unit, as shown in FIGS. 5, 6 and 7, the baghouse unit may be designed so that the relatively hot gas stream is passed through the sections placed at the corners of the baghouse unit, which offers the particular advantage of allowing the other sections to operate at particularly low temperature without the risk of condensation, as a result of the fact that the emission of heat to the surroundings from these other sections is thereby lower than if such sections were placed at the corners of the baghouse unit. Such an embodiment is shown in FIG. 8.

The invention will be further illustrated in the following by means of a comparative example and of examples illustrating the process according to the invention.

COMPARATIVE EXAMPLE

The process follows the principle shown in FIG. 1.

The total amount of flue gas removed from the boiler 1 is 2559 t/hour, the content of $SO_2$ being 800 ppm (based on volume).

The first stream removed via duct 2 amounts to 2400 t/hour and has a temperature of 446° C., whereas the second stream removed via duct 3 amounts to 159 t/hour and has a temperature of 429° C.

In the unit 4, the first stream is cooled down to 135° C. In the spray drying-absorption units 7, a calcium hydroxide suspension is sprayed, whereby a total of 75 t/hour of water evaporates so that the first stream after passing through the units 7 amounts to 2475 t/hour and has a temperature of 68° C.

When this first stream in duct 8 is subsequently united with the second stream in duct 3, the total stream in duct 9 amounts to 2634 t/hour, the temperature being 90.5° C.

After passing through the baghouse unit, the temperature of the gas stream has dropped to 85.0° C. and 81% of the original $SO_2$ content has been removed from said stream.

For achieving this absorption, slaked lime has been consumed in an amount corresponding to 3470 kg/h of burnt line (CaO) of industrial quality having an active CaO content of 88%.

EXAMPLE 1

The process follows the principle illustrated in FIG. 2. The gas leaving the boiler has the same $SO_2$ content as in the above comparative example, and the amount and the temperature of the gas passing through the ducts and the units 2–8 are as stated in the said example. The partial stream 20 amounts to 501 t/hour of gas from the first stream and has a temperature of 68° C. By uniting this partial stream with the second stream from duct 3, a stream of 660 t/hour having a temperature of 158° C. is obtained. This stream is led to sections 11 and 12 of the baghouse unit where the temperature therefore is about 158° C., which results in the $SO_2$ absorption being very low in these sections.

The remaining portion of the first stream (1974 t/hour) having a temperature of 68° C. is led to sections 13–18 of the baghouse unit. After passing through the sections of the baghouse, the gas streams are united in the outlet part of the baghouse unit and removed, their temperature being 85° C.

As the temperature in ¾ of the baghouse in this case is only 68° C., a substantial $SO_2$ absorption takes place in these parts of the filter, so that a substantially lower absorbent consumption is required in order to obtain the same percentage of $SO_2$ absorption, viz. 81% of the total quantity of $SO_2$ in the flue gas, the quantity of absorbent, expressed in terms of consumed burnt lime having an active CaO content of 88%, being 2550 kg/hour.

Thus in this case, a saving of 27% is achieved by following the process according to the invention, as compared to the amounts required when using the obvious heating principle as described.

EXAMPLE 2

The process is performed as depicted in FIG. 4. The gas leaving the boiler has the same $SO_2$ content as in the above comparative Example.

The stream removed via duct 2 amounts to 2700 t/hour and has a temperature of 440° C. After having passed the heat exchanger unit 4 the temperature of the gas is 137° C. 410 t/hour of this stream is withdrawn as the second stream and through duct 3 led to the sections 11 and 12 of the baghouse. The remaining part of the stream is treated in the spray dryer-absorbers 7 which it leaves at a temperature of 66° C. This stream is led to the remaining sections of the baghouse 13–18. After passing through the baghouse the gas streams are united in the outlet part of the baghouse unit and removed, the temperature being 72° C.

In this test CaO saving of 22% is experienced as compared to the amounts required when using the principle described in the above comparative Example.

We claim:

1. A process for desulfurization of hot, fly ash-containing flue gas produced in a boiler plant by means of a combined spray drying-absorption step and removal of the material produced by the spray drying-absorption and the fly ash in a baghouse filter plant, in which process a reheating of the gas treated by spray drying-absorption takes place by mixing the treated gas with a stream of hot flue gas diverted to by-pass the spray drying-absorption step, said process comprising the steps of
  (i) providing a first and a second stream of hot flue gas;
  (ii) using the first stream of flue gas for preheating a flow selected from the group consisting of combustion air and feed water for the boiler plant, thereby cooling said first stream;
  (iii) spraying an aqueous suspension of basic material into said first stream, whereby the water of the suspension evaporates resulting in a further cooling of the first stream to a temperature lower than the temperature required, if the stream should without admixture or reheating be discharged into the atmosphere after subsequent purification, and whereby a substantial portion of sulfur dioxide of the first stream is absorbed from a powder which contains reaction products of the absorption and unreacted basic material;
  (iv) separating a partial stream from said first stream and combining said partial stream with said second stream of hot flue gas;
  (v) passing the combined partial stream and second stream through a part of a fabric filter of a baghouse plant;
  (vi) passing the remainder of said first stream through the remainder of the fabric filter of the baghouse plant; and
  (vii) downstream of the fabric filter mixing said combined stream and said remainder of the first stream to form a mixed stream, and discharging the mixed stream into the atmosphere.

2. A process as claimed in claim 1, wherein in step (iii), water is evaporated in such an amount that the temperature of the first gas stream falls to 50°–80° C.; the second stream together with the partial stream from the first stream is passed through 10–40% of the baghouse filter area, while only the remainder of the first stream passes through the remaining 90–60% of the filter area; and the quantitative ratio of the first to the second stream is adjusted so as to obtain a temperature of 60°–100° C. for the total amount of flue gas released to the atmosphere.

3. A process as claimed in claim 1, wherein the second flue gas stream together with the partial stream from the first stream is led through at least one section of a baghouse unit separated by partition walls from the remaining part of the baghouse unit through which only flue gas from the remainder of the first stream is passed.

4. A process according to claim 2 or 3 in which use is made of a baghouse plant having a filter fabric consisting of glass fibers coated with polytetrafluoroethylene, wherein the ratio between the partial stream from the cooled first stream and the hot second stream is selected to obtain a temperature of the mixture of these two streams of 120° to 250° C. before contacting the baghouse fabric.

5. A process for desulfurization of hot, fly ash-containing flue gas produced in a boiler plant and having served for preheating a flow selected from the group consisting of combustion air and feed water for the boiler plant, having thereby been cooled to 100°–300° C., by means of a combined spray drying-absorption step and removal of the material produced by the spray drying-absorption and the fly ash in a baghouse filter plant, in which process a reheating of the gas treated by spray drying-absorption takes place by mixing the treated gas with a stream of hot flue gas diverted to by-pass the spray drying-absorption step, said process comprising the steps of (i) dividing the gas stream into a first stream and a second stream;

(ii) spraying an aqueous suspension of basic material into said first stream, whereby the water of the suspension evaporates resulting in a further cooling of the first stream to a temperature lower than the temperature required, if the stream should without admixture or reheating be discharged into the atmosphere after subsequent purification, and whereby a substantial portion of sulfur dioxide of the first stream is absorbed forming a powder which contains reaction products of the absorption and unreacted basic material;

(iii) passing the second stream through a part of a fabric filter of a baghouse plant;

(iv) passing the first stream through the remainder of the filter of the baghouse plant; and (v) downstream of a fabric filter mixing said first and said second stream and discharging the mixture thereof into the atmosphere.

6. A process as claimed in claim 5, wherein in step (ii), water is evaporated in such an amount that the temperature of the first gas stream falls to 60°–75° C.; the second stream is passed through 10–40% of the baghouse filter area, while only the first stream passes through the remaining 90–60% of the filter area; and the quantitative ratio of the first to the second stream is adjusted so as to obtain a temperature of 70°–95° C. for the total amount of flue gas released to the atmosphere.

7. A process as claimed in claim 6, wherein the second flue gas stream is led through at least one section of a baghouse unit separated by partition walls from the remaining part of the baghouse unit through which only flue gas from the first stream is passed.

8. A process as claimed in claim 6 or 7, in which use is made of a baghouse plant having a filter fabric consisting of glass fibers coated with polytetrafluoroethylene, wherein the temperature of the second stream led to the baghouse is 120°–250° C.

* * * * *

UNITED STATES PATENT AND TRADEMARK OFFICE
CERTIFICATE OF CORRECTION

PATENT NO. : 4,372,926
DATED : February 8, 1983
INVENTOR(S) : Klaus E. Gude and Karsten S. Felsvang It is certified that error appears in the above—identified patent and that said Letters Patent is hereby corrected as shown below:

On the Title Page of the Patent, correct the residence of the inventor Klaus E. Gude to read --Vedbaek--;

The third inventor, Everett L. Coe, should be removed as a co-inventor of this patent.

In Claim 7, change the dependency of "claim 6" to read --claim 5--; and

In Claim 8, change the dependency of "claim 6 or 7" to read --claim 5 or 7--.

Signed and Sealed this

Fifth Day of March 1985

[SEAL]

Attest:

DONALD J. QUIGG

Attesting Officer     Acting Commissioner of Patents and Trademarks